Feb. 27, 1945.  H. F. POUTIE  2,370,487
QUICK CHANGE DRILL CHUCK
Filed March 22, 1943
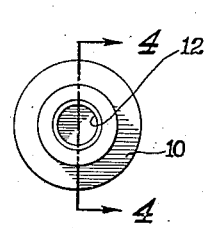
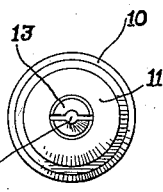
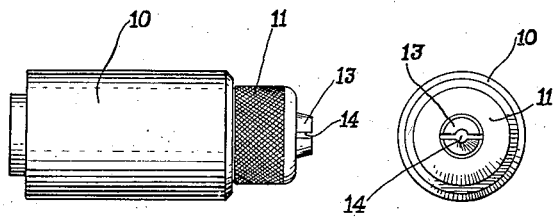
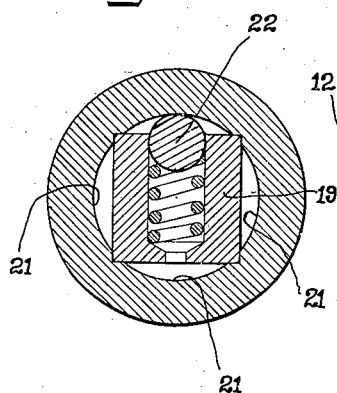
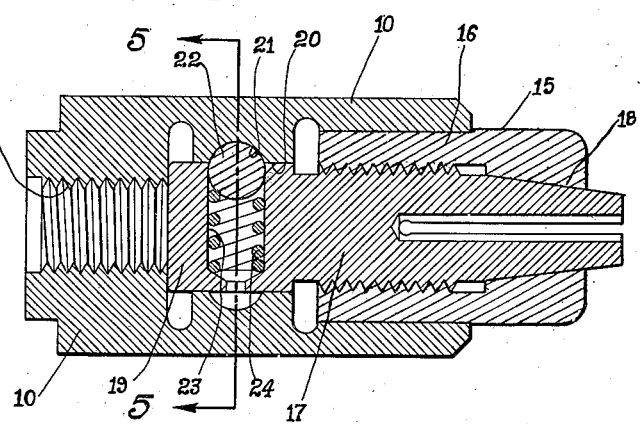
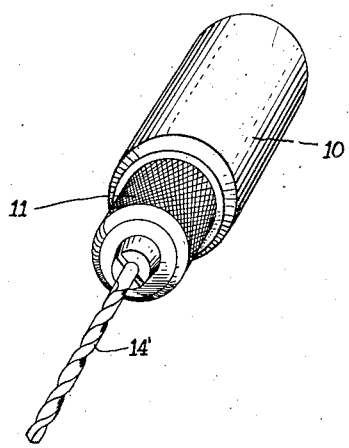
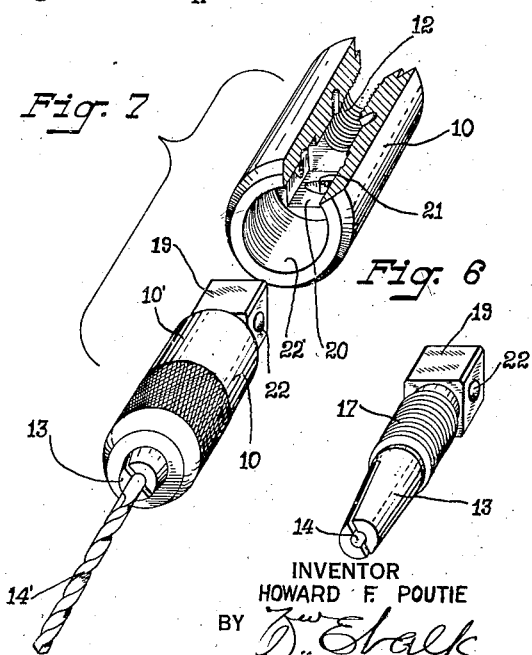
INVENTOR
HOWARD F. POUTIE
BY
ATTORNEY Patented Feb. 27, 1945

2,370,487

UNITED STATES PATENT OFFICE 2,370,487

QUICK-CHANGE DRILL CHUCK

Howard F. Poutie, Kenmore, N. Y., assignor to Curtiss-Wright Corporation, a corporation of Delaware Application March 22, 1943, Serial No. 480,105

3 Claims. (Cl. 279—42)

This invention relates to power drills, and more particularly to the drill heads thereof.

It has been found in the aircraft industry that the conventional drills being used have a considerable number of disadvantages. With the arrangements now in use it becomes necessary, upon changing from one size drill to another, to either provide with the drill a key which is often lost by the operator, or provide a multiple number of the drill bodies themselves, each having a different size drill element. In the case of the type utilizing a key to release the drill, time is consumed in the operation and more often the key becomes lost and the operator must go to another operator to borrow a key. Also these keys often have minute teeth to cooperate with the teeth on the chuck nut, the teeth on both of which become readily broken or worn. The cost and trouble of repairing these key type chucks is considerable. When a separate drill body is used for each size drill element, the number of drill bodies required and the wiring requirements for the attachment of the drill bodies become great for but a single operator.

It is an object of the present invention to provide a quick change drill arrangement and one wherein the use of a key is unnecessary to change from one size drill element to another drill element.

It is another object of the invention to provide a drill arrangement whereby the need for a plurality of drill bodies by an operator, drilling different size holes, is unnecessary, thereby keeping to a minimum the number of drill bodies needed for a given war plant.

It is still another object of the invention to provide a drill arrangement whereby the drills themselves can be secured in chuck receiving elements by one who is an expert in properly centering these drills and by one removed from the operators station whereby these drills, upon becoming broken, can be replaced without the need for the operator holding up the work operation.

According to the present invention, a quick detachable chuck with a drill element in it, is supplied to the operator. This chuck is so formed as to be readily insertable into an adapter on the drill body. This adapter has a polyhedral shaped opening arranged to receive a correspondingly shaped head on the chuck. The side walls of the opening in the adapter have depressions adapted to automatically receive a spring biased detent in the polyhedral portion on the chuck whereby the chuck is retained in the adapter. The chuck arrangement includes a chuck nut adapted to be tightened over a collet to secure a drill element in the collet. There are a number of these chucks fitted with the desired sized drills and located in a place convenient to the operator. The operation of merely withdrawing the drill chuck and inserting another drill chuck is a simple one. The drill element is left to remain in the chuck and therefore, there is no necessity for a key to remove the same.

For other objects and for a better understanding of the invention, reference may be had to the following detail description taken in connection with the accompanying drawing, in which Fig. 1 is a side view, in elevation, of the adapter with the drill chuck in it.

Fig. 2 is an end view of the combination shown in Fig. 1.

Fig. 3 is an end view of the same combination shown in Fig. 1, but at the opposite end from that shown in Fig. 2.

Fig. 4 is an enlarged cross sectional view of the combined adapter and chuck as taken along the line 4—4 of Fig. 3.

Fig. 5 is an enlarged cross sectional view through the adapter and drill chuck taken at the location of the detent mechanism and substantially along the line 5—5 of Fig. 4.

Fig. 6 is a perspective view of the collet with the polyhedral formation thereon.

Fig. 7 is an exploded view of the drill chuck and the adapter, the drill chuck having the drill in it and aligned for insertion into the adapter.

Fig. 8 is a perspective view of the combined adapter and drill chuck, with the drill chuck inserted.

Referring now particularly to Figs. 1, 2, and 3, there is shown an adapter 10 with a drill chuck 11 inserted in it. This adapter 10 has a threaded opening 12 for its attachment to a drill body. Within the chuck 11 is a tapered collet 13 with a slot 14 therein for receiving a drill element 14'.

The chuck 11 also includes a chuck nut 15 internally threaded at 16 for connection with a threaded portion 17 of the collet 13. This chuck nut 15 also has a conical shaped opening 18 adapted to slide over the tapered collet 13 to effect the tightening or release of the drill element 14'. Once the chuck nut 15 is tightened onto the collet, the drill element becomes integral with the chuck. All of this is done without the aid of a key.

On the rearward end of the collet, there is provided a polyhedral or squared formation 19 arranged to fit within a squared opening 20 in the adapter 10. On the faces of the squared opening 20 of the adapter 10, there are provided impressions 21 adapted to receive a detent ball 22 arranged to protrude from a transverse opening 23 in the squared formation 19 of the collet. This ball 23 is backed up by a spring 24 and as the drill chuck is fitted into the adapter, the ball 22 will first be depressed and finally set in one of the impressions 21 depending upon which of the faces of the opening is aligned with the ball 22. A portion 10' of the chuck will fill a cylindrically shaped opening 22' of the adapter.

Preferably the internal surfaces on the adapter and the surfaces of the drill chuck which engage with the surfaces in the adapter, are hardened and chromium plated to make the insertion of the drill chuck easily and free from any tendency to become burred.

It should be apparent that with this arrangement of an insertable chuck that only a single drill body is needed by one operator. The operator need have only one electric drill body wired to but a single electric outlet.

It should now be apparent that there has now been provided a drill chuck so formed as to be readily insertable into an adapter and wherein the only need of the operator to change from one size drill element to a drill element of another size, is that of simply removing one drill chuck and inserting the other, the connection between the drill chuck and the adapter being quickly attachable. This requires a minimum of effort, and the use of a key, which is often unavailable, is rendered unnecessary. This also enables the drill element to be located in the chuck in the proper fashion by one who may be an expert in proper aligning of the drill elements thereby eliminating the risk which may accrue when the drill is located by the more or less inexperienced operator.

While various changes may be made in the detail construction, it shall be understood that such changes shall be within the spirit and scope of the present invention as defined by the appended claims.

I claim as my invention:

1. An adapter-holder for a tool of the character described including a body which is adapted to be connected to a driving member, said body being formed with a bore having an inner, multi-sided section and a seat at the inner end of said section, a collet having a multi-sided head which is adapted to be accommodated in the socket provided by said multi-sided section and seat, said collet having an externally threaded section, being formed at its outer end with an axial bore to receive said tool and being split axially at said end to provide jaws for gripping said tool, a threaded sleeve-like element which screws onto the threaded section of said collet for actuating said jaws, an end section of said element extending into and having a close fit in said bore and the exterior walls of said end section engaging the walls of the said bore to reinforce said collet against rocking movement in said socket, and means for releasably securing said collet against axial movement in said bore.

2. An adapter-holder for a tool of the character described including a body formed with a through-bore, one end of which is adapted to receive a driving member, an intermediate section of said bore being multi-sided and at the juncture with said first mentioned section being formed to provide a seat, a collet having a multi-sided head which is accommodated in the socket provided by the intermediate section of said bore and said seat, said collet having an externally threaded section, being formed at its outer end with an axial bore to receive said tool and being split axially at said end to provide jaws for gripping said tool, an internally-threaded, sleeve-like element which screws onto the threaded section of said collet for actuating said jaws, an end section of said element extending into and having a tight fit in the other end of said bore and the exterior walls of said end section engaging the walls of the said bore to reinforce said collet against rocking movement in said socket, and means for releasably securing said collet against axial movement in said bore.

3. An adapter-holder for a tool of the character described including a body formed with a through-bore, an end of which is adapted to receive a driving member, an intermediate section of said bore being multi-sided and at the juncture with said end section being formed to provide a seat, a collet having a multi-sided head which is accommodated in the socket provided by the intermediate section of said bore and said seat, detent means carried by said head for cooperating with a wall of the intermediate section of said bore to releasably secure said collet against axial movement in said bore, said collet having an externally threaded section, being formed at its outer end with an axial bore to receive said tool and being split axially at said end to provide jaws for gripping said tool, and an internally-threaded, sleeve-like element which screws onto the threaded section of said collet for actuating said jaws, an end section of said element extending into and having a tight fit in said bore and the exterior walls of said section engaging the walls of the said bore to reinforce said collet against rocking movement in said socket.

HOWARD F. POUTIE.